United States Patent [19]

Skidmore

[11] 4,451,108
[45] May 29, 1984

[54] DATA-TERMINAL SERVICE OUTLET

[76] Inventor: Donald D. Skidmore, 12 Bloomer Rd., Brewster, N.Y. 10509

[21] Appl. No.: 412,924

[22] Filed: Aug. 30, 1982

[51] Int. Cl.³ ............................................. H01R 13/74
[52] U.S. Cl. ................................ 339/177 R; 339/123; 339/154 R
[58] Field of Search ................ 220/241; 339/122, 123, 339/177 R, 154 R; 174/65-68

[56] References Cited

U.S. PATENT DOCUMENTS

| | | | |
|---|---|---|---|
| 1,829,648 | 10/1931 | Haering | 174/58 |
| 2,385,620 | 9/1945 | Fleckenstein | 339/123 X |
| 3,110,753 | 11/1963 | Witort | 174/65 |
| 3,110,754 | 11/1963 | Witort et al. | 174/70 |
| 3,303,264 | 2/1967 | Saul et al. | 174/48 |
| 3,622,945 | 11/1971 | Winston | 339/122 X |

*Primary Examiner*—Eugene F. Desmond
*Attorney, Agent, or Firm*—Arthur K. Hooks

[57] ABSTRACT

A unitary-data-terminal-service outlet is mounted in a wall for providing a data terminal with both electrical power and a link with a central processing computer. An electrical receptacle is housed in a standard outlet box which is mountable to a wall stud. A face plate mounts to the receptacle and extends flush against the wall beyond the box. A hole is provided in the extended portion of the coverplate and a corresponding hole is provided in the adjacent wall board to mount a coaxial-feedthrough-coupler. A coax cable carrying signals to and from the computer is connected from the inner wall to the coupler and a coax cable to the data terminal connects to the outside end of the coupler. In an office building in which it is anticipated to utilize many data terminals, one such data-terminal-service outlet is provided in the wall at each site at which a data terminal is expected to be employed.

7 Claims, 5 Drawing Figures

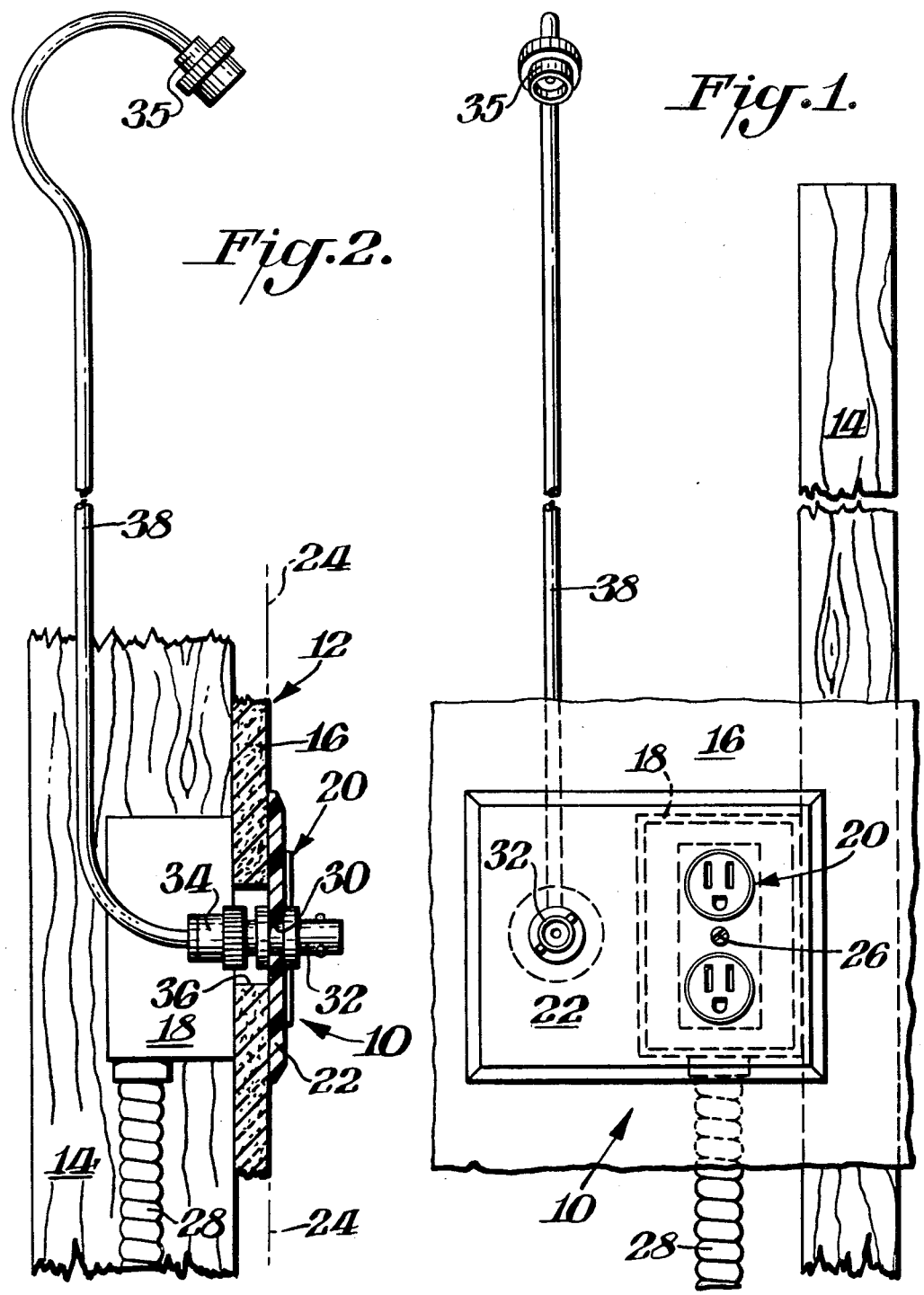

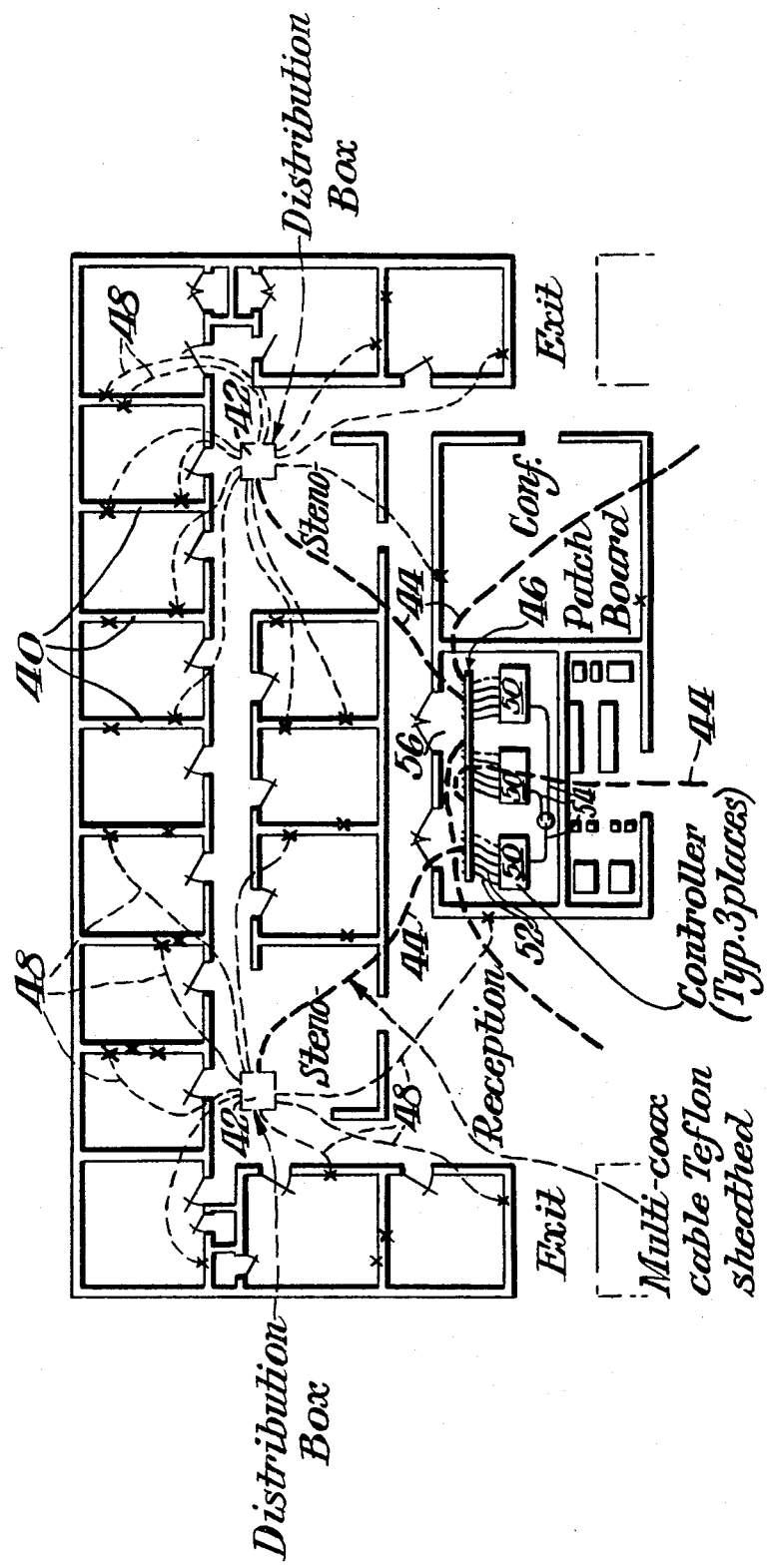

DATA-TERMINAL SERVICE OUTLET

BACKGROUND OF THE INVENTION

This invention relates to a data-terminal-service outlet at which a digital-data terminal may be connected to a remote computer, and more particularly pertains to such an outlet that also incorporates a power receptacle from which the data terminal may be powered.

A data terminal, as used herein, is meant to encompass any digital-data handling device that is intended to communicate with a digital computer, such as CRT displays, punched card recorders, keyboard-data-entry equipment and the like. The connection between a data terminal and a computer typically includes a single coax cable providing two way communication therebetween. Although, it has been known for many years to provide sophisticated links between a data terminal and a remote computer via translators and converters of digital data for transmission over telephone lines and by radio, direct coax connection between a computer and data terminals have been very recently and with minor exceptions for data terminals that are located in the same or in an adjacent room with the computer mainframe. Now an explosive growth is occurring in the use of data terminals in very large numbers, all under the same roof with the main computer(s).

The computer is connected to one or more time multiplexing controllers and a coax cable is connected from the controller patch panel directly to each data terminal. These individual cables are typically placed in a ceiling-cold-air-return space entering the site of a data terminal through a hole in a wall or a hole in the ceiling. Also heretofore, power to data terminals has been obtained from a standard single-purpose power outlet.

Digital computer signals between a computer and a terminal may be characterized as low voltage high frequency signals and a high-frequency-carrying coax cable must be used. Other low voltage wiring such as twisted pairs, multiple adjacent strands of insulated wire sheathed in a plastic jacket, or twin-lead as used for domestic television connections to an antenna are all subject to picking up stray electrical fields that tend to interfere with the computer/terminal operation. Coax on the other hand provides excellent shielding against such externally generated interference. But coax resists bending and is generally unwieldy.

It has long been a rule of safety and common sense to positively isolate power circuits from low-voltage signal circuits usually by physical separation to make it virtually impossible that due to degradation of insulation in the course of time, or due to damage to wiring or due to inept attempts at wiring maintenance there be an accidental connection between low and high voltage circuitry. Such an accidental connection would likely first be discovered by a hapless user of the low voltage equipment that may carry power line voltages with respect to his environment. Otherwise it may start a fire in the simple insulation of a low voltage system. The point in either a power or low-voltage wiring system where the original wire insulation is stripped to electrically join the wire to another conductor is the point of greatest danger of contact with a foreign conductor.

It has therefore been a long established practice to make connections between power cables and associated receptacles, switches and other power cables in a grounded metal box that excludes low voltage cable. Low voltage cable is likewise connected in a separate box exclusively dedicated to low voltage receptacles, switches, telephones, buzzers, bells, thermostats, fire alarm sensors, other low voltage cable and the like. In a particular case, a special service outlet box has been designed with two completely separate chambers, one accommodating a power receptacle and the other a telephone jack. It is also known to provide a similar special-dual-chamber box having a radio-antenna receptacle and a power receptacle, respectively, mounted therein. However, such dual boxes are not mass produced and are expensive and cannot readily accommodate high quality computer-signal-coax cable.

It is therefore an object of this invention to provide a unitary low cost data-terminal-service outlet providing both communication with a computer and access to electrical power.

SUMMARY OF THE INVENTION

A unitary-data-terminal-service outlet is comprised of an open faced electrical-power-outlet box. A power receptacle is mounted in the open face of the box. A cover plate is mounted over the open face and has a hole that exposes the receptacle to provide access thereto by a mating power plug.

The cover plate has an extension beyond the box. A digital data coupler means is provided in the extended cover plate portion for coupling digital signals via two cables, respectively, from one side to the other side of the cover plate between a data terminal and a computer.

The coupler means is preferably a feedthrough coax coupler mounted in a hole in the extended cover plate portion. The cover plate may be of plastic effecting the necessary electrical insulation between the power outlet box and the low voltage coupler. Alternatively, a stainless steel cover plate may be used, and the insulation provided by a pair of insulating grommets for mounting the coupler in a hole in the steel plate.

A stiff coax cable within the cavity of a wall in which the power outlet box is mounted can be bent with the necessarily large radius to connect at the rear to the coupler in the extended portion of the cover plate since it is not confined to an outlet box of its own. A hole may be provided in the wall board to accommodate the rear portion of the coupler and a mating connector of the coax cable, which hole will be covered by the extended cover plate.

The unitary service outlet of this invention provides a more orderly installation that is more convenient to the user and the installer. The installation of many such unitary service outlets in an office building under construction can now be planned and executed in a routine manner. Retrofitting an existing building is also surprisingly easy, requiring only a new hole in the wall board along-side an existing power outlet and the replacement of the old cover plate with a wider one having a coax coupler mounted therein.

BRIEF DESCRIPTION OF THE DRAWINGS

FIG. 1 shows in face view a data-terminal-service outlet of this invention.

FIG. 2 shows in side view the data-terminal-service outlet of FIG. 1.

FIG. 3 shows a portion of an office building floor plan having superimposed thereon a schematic representation of a digital data distribution system especially compatible with this invention.

DESCRIPTION OF THE PREFERRED EMBODIMENTS

Figure 4:
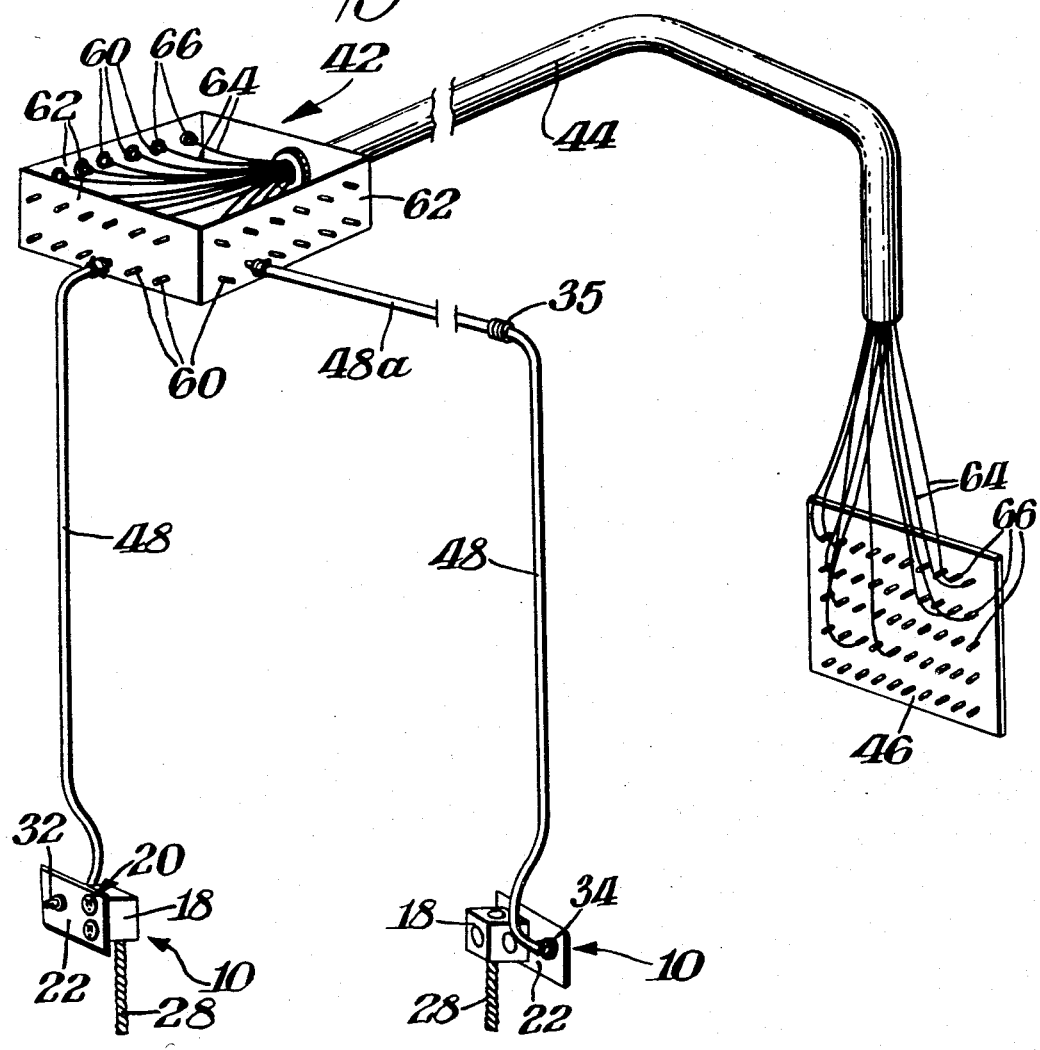
FIG. 4 shows a free body isometric view of the key elements of the digital-data distribution system of FIG. 3 including the service outlet of FIG. 1.

The data-terminal-service outlet 10 of FIGS. 1 and 2 is shown mounted in a wall 12 of vertical wood (or metal) studs, e.g. 14, and a panel of SHEETROCK, tradename of United States Gypsum Co., Chicago, Ill. or wall board 16. A standard electrical power outlet box 18 (NEC article 370, part 370-6a) made of steel, contains a standard dual electrical power receptacle 20 mounted therein. A hard plastic face plate 22 is mounted over the open face of box 18 that lies in the plane 24 in which also lies the outer surface of the wall board 16. The face plate 22 is mounted to the power receptacle 20 by means of a screw 26. Face plate 22 has apertures therein through which access may be had to the receptacle 20 that is intended to receive a power plug (not shown) from a data terminal (not shown). An armored power cable 28 brings electrical power to the box 18 and is connected inside the box 18 to the dual receptacle 20.

Another aperture 30 is provided in an extended portion of the cover plate 22 (leftward as shown in FIG. 1) wherein an BNC type feedthrough coax coupler 32 (e.g. MIL type UG 492 D/U) is mounted. Two BNC type coax plugs (PL20-N made by Trompeter Electronics, Chatsworth, Calif.) 34 and 35 are fitted to the ends of a coax cable 38. One of the coax plugs 34 is plugged onto the inner end of the feedthrough coupler 32. The other plug 35 is positioned above in ceiling space or in a utility chamber to be described.

The cable 38 is a high quality type such as the MIL type RG 62 A/U having an inner center conductor of about 0.025 inches (0.6 mm) for a low signal attenuation and having an overall diameter of about 0.24 inches (6 mm). This particular cable has been used for many years to connect data-terminals to a computer and its popularity for this and other purposes has led to mass production by several manufacturers (e.g. Alpha Wire Corporation, Elizabeth, N.J.; and Times Wire and Cable Company, Wallingford, Conn.) and also led to a relatively low price. This cable also includes a braided outer shield and is moderately flexible. Manufacturer's recommendations for this type cable is that they be installed with no greater bend than a radius of about ten times the diameter of the cable. Flexing such cable more sharply tends to cause the degradation of both electrical and mechanical characteristics. Bends near the cable terminations, e.g. near the points of terminations with plugs 34 and 35, tend to be especially destructive. A bend of 10 times the radius of RG 62 cable amounts to a radius of about 2.4 inches (6 cm). A standard outlet box, e.g. 18 is typically 2.5 inches (6.2 cm) deep. A typical BNC coupler 32 with a BNC plug 34 plugged into it preempts about 1.56 inches (4 cm) of that box depth. With reference to FIG. 2 it is now clear that if the bending of the cable 38 to a radius sharper than ten times its radius is to be avoided, then there is insufficient space to fit the cable within such a standard box while at the same time conforming to that quality conscious criterion.

From FIGS. 1 and 2 it can be seen that the coax cable 38 does not enter an outlet box at all. The BNC coupler 32 mounted in cover plate 22 extends through a hole 36 in the sheetrock 16 where it is connected by plug 34. There is ample room within the wall cavity behind the sheetrock 16 to accommodate large radius bends (i.e. >2.4 inches) in cable 38. The available depth within such a wall space is typically 4 inches (10 cm).

The face plate 22 is made of an insulating plastic providing good electrical insulation between the digital data coax circuits and the power circuits. However, the cover plate 22 may be of metal, e.g. stainless steel and an insulating grommet (not shown) used for mounting the coupler 33 in the plate 22.

Aside from the obvious advantage of low cost, the data-terminal-service outlet 10 is especially easy to install and service. It is anticipated that installation of a large number of such outlets 10 will in new construction be made for the most part in open walls. Thus the coax cables 38 may be suspended in the wall cavities adjacent the mounted power boxes 20. Subsequently the sheetrock 16 will be installed. Finally the cable plugs 34 will be plugged into the feedthrough couplers 32 and the face plates 22 mounted by means of screws 26 to power outlets 20 and power outlet box 18.

To install a data-terminal-service outlet (10) of this invention in existing office buildings, a hole 36 is cut in the wall board 16 adjacent an existing power outlet and a coax cable 38 lowered from the cold-air-return/utility chamber in the ceiling through the same wall cavity that houses the power outlet box 18. The original power outlet cover plate is removed. A new outlet plate 22 with extended portion and BNC feedthrough coupler fitted therein is connected by the coax cable 38 and the plate 22 is mounted to the power outlet box 18.

It is of course even easier to install such data-terminal-service outlets (10) in new construction before the wall board (16) goes on.

In either event, very little special hardware is needed. Cover plates intended to cover a double-wide power outlet or switch box are available with one side blank. They are made for use in situations wherein the outlet box is double size and receives more than two or three power cables for joining therein, serving as a multiple junction and power-distribution box in addition to housing one dual-power receptacle or one power switch. Such wide and half-blank cover plates may be quite simply modified by drilling a hole 30 in the blank side of plate 22 wherein to mount the BNC coupler 32.

The use of data terminals in businesses of all kinds is growing rapidly and the office building of the future will incorporate more permanently installed digital data handling cable than power cable. It is anticipated that most offices will be provided with at least one data-terminal-digital-signal outlet.

Also, and more generally, another or several other, coax couplers (not shown) may be mounted in the extended portion of a cover plate (22) when the data terminal requires additional communication channels, e.g. when at one data terminal site it is desired to have auxillary display devices such as a printer or CRT display and when it is desired to connect with a second computer.

The office building floor plan of FIG. 3 exemplifies such an office. The superimposed digital-data distribution system is comprised of digital-data wall outlets X at the partitions 40 of the various office and clerical work stations where data-terminals might be needed. It is further comprised of portions shown by dashed lines that are installed mostly in a utility space in the floor or ceiling. That portion is made up of distribution boxes 42, a multiple-coax-cable 44 running between a computer controller patch board 46 and each one of the distribution boxes 42, and an individual coax cable 48 running between each data outlet X and one of the distribution boxes 42.

Three data-terminal controllers 50 (e.g. IBM type 3272) are shown connected via coax cables 52 to the patch board 46. The remote central processing computer(s) (not shown) is (are) connected to the controllers 50 via cables 54.

It has been customary in the past to run a single coax cable, usually RG 62, from the patch board 46 all the way to the data-terminal passing through a hole in the ceiling or wall of the data-terminal office. Large multi terminal systems have evolved in present day office buildings using that system of data distribution leading to a massive amount of cable being held in the utility/-cold-air-return space, much of it abandoned there due to the difficulty of identifying its two ends when data-terminal locations had to be altered. Not only did the space occupied by the jumbled pile of cable become limiting to other intended uses of it, but trouble shooting, maintainance and the task of relocating terminal service points became much more difficult. For example, even if both ends of a cable could be identified, it often could not be removed owing to its being bound in the pile.

The digital-data-distribution system shown in FIG. 3 is conceived as providing an orderly way to make connections between a patch board 46 and outlets X that may offer strong resistance to obsolescence, especially in new construction.

The architect may now call for a digital-data outlet X alongside every or every other outlet X using the low cost and orderly data-terminal-service outlet 10 of FIGS. 1 and 2. He then specifies the data carrying capacity, numbers and location of distribution boxes 42 to provide service to the planned outlets 10. One or more multi-coax cables 44 are then chosen for connecting the multi-coax-cables 44 with the patch board 46. The plans for the separate cables 48 to each outlet 10 may be decided after the walls are closed in and the building even occupied. The connection of a wire 48 to a distribution box 42 may simply involve lifting a ceiling panel and making the connection.

Insofar as it is known, there has heretofore been no use of a bundled-multi-coax cable in a buildings closed utility spaces or wall cavities, at least because no multiple-coax cable has been made that meets the fire resistance requirement and none are made that meet the presently specified criteria for electrical attenuation per unit length. These two criteria, and especially the latter, are believed to have effectively blocked any changes in the patch board to terminals distribution system based solely upon the use of RG 62 coax, which cable has served reliably for so many years.

When, as in most present circumstances, the number of data-terminals operating at a given location is relatively small, such a simple, reliable and conservative distribution system has been justified.

Also, few have been conscious of the aforementioned problems portended by the use of more and more data-terminals at a given location. The cost of the coax distribution system has remained a tiny fraction of the cost of the computer, controllers and data terminals. The electronics and organizational problems in computer installations have been many, but no significant ones were attributed to the coax distribution network. The routing through the utility spaces and wall cavities of the coax cable linking a patch board to data-terminals is routinely left to electricians who may be experts in the field of power distribution systems but who are generally unfamiliar with the art of digital data hardware and circuits. Thus this growing problem has remained obscure and relatively unattended Referring to FIG. 4, a distribution box 42, with cover removed, has 36 BNC couplers 60 mounted in the bulkheads 62. Two data-terminal-service-outlets are shown connected to the box 42. A multi-coax cable 44 contains 36 individual "home run" coax cables 64. Each cable 64 is terminated at its two ends, respectively, with two BNC connectors 66.

The bulkheads 62 of distribution box 42 are of steel. Thus it is necessary to mount each BNC coupler 60 with insulating washers (not shown) to provide electrical isolation therebetween. Otherwise the couplers 60 may be mounted in insulated plates (not illustrated) that are made a part of the bulkheads 62.

The coax cables 48 that are to be located in a vertical wall cavity are preferably TEFLON jacketed RG 62 A/U as is the linking coax 48a that is to be in the closed cold-air-return/utility chamber of the ceiling with the box 42, although PVC jacketed cable is presently permitted by NEC in closed vertical spaces. A BNC union 68 joins a BNC connector 35 of a vertical cable 48 to a BNC connector 70 at one end of cable 48a. By the latter means, all cables 48 may be of the same uniform length, reaching from the outlet coupling 32 just to the top of the wall. Alternatively, the coupled cables 48 and 48a may be replaced by a single but longer cable of various lengths.

The patch board 46 is made of PLEXIGLAS, tradename of Rohm and Haas Co., Phila., Pa. It is an insulative acrylic resin plastic. An array of BNC feedthrough couplers 72 are mounted in the patch board 46 and are connected by BNC connectors 66 from the multi-coax-cable 44.

A multi coaxial cable (44 in FIG. 4) manufactured by Manhattan Electric Cable Corporation, Rye, N.Y., identified as a M39100 series, UL Style No. 2386, has been found that includes individual coax cables (64), UL Style No. 1379, being smaller but having electrical characteristics that are almost identical to those of RG 62 A/U, except that signal attenuation per unit length is about twice that of RG 62 A/U.

Figure 5:
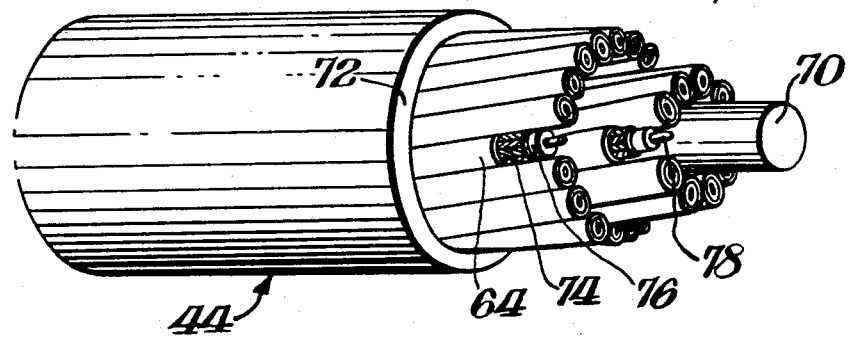
FIG. 5 shows one end of a multi-coax-cable trimmed to show its construction.

A Style 2386 multiple-coax-cable 44 is shown in FIG. 5 wherein the individual coax cables 64 are grouped around a plastic core 70 and have a PVC jacket 72 extruded over them. Each individual cable 64 has a PVC jacket 74, a braided copper sheath 76 and a solid copper center conductor 78. The supplier has quoted the same cable modified wherein the TEFLON is substituted for the PVC.

Additional description of this distribution system is provided in my patent application, Ser. No. 412,923, filed concurrently herewith, entitled Digital Data Distribution System.

It can now be appreciated that the unitary data terminal service outlet of this invention as a part of that data distribution system offers a very high degree of convenience, flexibility and economy not only at installation but also in use.

What is claimed is:

1. A data-terminal-service outlet for providing a unitary service at which a digital-data-terminal may be connected to a computer and a source of electrical power, comprising:

an electrical-power outlet box with an open face;

an electrical-power-plug receptacle mounted in said outlet box;

a cover plate being mounted over said open face of said outlet box and having an aperture exposing said receptacle, said cover plate lying substantially all in one plane and having an extended portion projecting beyond and away from said box; and a digital data coupling means in said extended portion of said cover plate for coupling digital signals via two cables, respectively, from one side to the other side of said plate, respectively, between said data terminal and said computer.

2. The data-terminal outlet of claim 1 wherein said coupling means is comprised of a coaxial-cable feedthrough coupler mounted in a hole provided therefore in said extended cover plate portion.

3. The digital-data-terminal outlet of claim 2 additionally comprising an insulating means for electrically insulating said feedthrough coupler from said outlet box.

4. The digital-data-terminal outlet of claim 3 wherein said cover plate is of an insulative plastic and said insulating means consists of said insulative cover plate.

5. The digital-data-terminal outlet of claim 2 wherein the inside of said cover plate is directed toward said outlet box, and additionally comprising a coax-cable and two coaxial-connectors mounted, respectively, to the two ends of said cable, one of said connectors being mated with said feedthrough coax coupler at said inside of said cover plate.

6. The digital-data-terminal outlet of claim 4 wherein said coax cable has a length of about 5 to 10 feet that corresponds to the distance between the point in a wall in which said outlet box is intended to be mounted and the space at the top of the wall that may carry a connecting length of coax-cable and a digital-data distribution box.

7. The digital-data-terminal outlet of claim 4 additionally comprising an electric power cable having one end entering said power-outlet box for connection to said power receptacle.

* * * * *